United States Patent Office 3,488,320
Patented Jan. 6, 1970

3,488,320
PROCESS FOR CURING AN EPOXY RESIN WITH AN AMINE IN THE PRESENCE OF A MAGNESIUM HYDROXIDE ACCELERATOR
Albert J. Dalhuisen, San Jose, Calif., assignor to Merck & Co., Inc., Rahway, N.J., a corporation of New Jersey
No Drawing. Filed Mar. 24, 1967, Ser. No. 625,607
Int. Cl. C08g *30/14*
U.S. Cl. 260—47
3 Claims

ABSTRACT OF THE DISCLOSURE

Epoxy resin compositions containing amine curing agents and magnesium oxide, magnesium hydroxide or mixtures thereof, which serve to modify the curing schedule of the epoxy resin.

SUMMARY

This invention is concerned with a novel composition of matter comprising epoxy resins. More particularly, it is concerned with a composition of matter comprising epoxy polymer or monomer, amine curing agents therefor, and magnesium oxide, magnesium hydroxide, or mixtures of both materials. Still more particularly, it is concerned with rapid curing epoxy compositions containing magnesium oxide, magnesium hydroxide, or mixtures thereof, and a process for preparing such novel compositions.

Epoxy resins are generally commercially available materials which find use in various applications. To mention a few, they are used in surface coatings, pipe, aircraft parts, for casting tools and dies, and for encapsulation of electrical parts. In order that the particular article or application be made by a process economically feasible and commercially profitable, it is often desirable to modify the curing schedule of the epoxy resin.

It is an object of this invention to provide compositions of matter comprising epoxy resins, amine curing agents or hardeners, and magnesium oxide, magnesium hydroxide, or their mixtures. It is a further object of this invention to provide a process for preparing such compositions. It is a further object to provide a method and composition permitting modification of the cure schedule of epoxy resins. A still further object is provision of means for greatly increasing the cure rate of epoxy resins and amine hardeners by use of magnesium oxide or hydroxide as an accelerator. Further objects will be apparent from the following description of the invention.

It has now been found in accordance with the present invention that magnesium oxide and magnesium hydroxide, employed singularly or in combination, are particularly beneficial in decreasing the cure time of epoxy resins containing amine curing agents. The epoxy resins useful as starting materials in the present invention are normally derived from epichlorohydrin, or similar materials and hydroxy-containing compounds. The resins would also include epoxy novolac type materials, aliphatic resins based on polyglycols, cycloaliphatic resins, and flame retardant resins containing halogen. Also included are polyepoxides of olefins and other unsaturated compounds, such as unsaturated vegetable oils and cyclic dienes. Examples of hydroxy-containing compounds are: diphenols, glycols, i.e. compounds containing two hydroxy groups such as ethylene glycol and polyhydroxy compounds such as glycerine and the like. A commonly used epoxy resin is prepared from p,p'-isopropylidenediphenol (bisphenol A) and epichlorohydrin. As illustrative of the epoxy resin which may be used in accordance with the invention, there may be mentioned Epon 828 a composition prepared from epichlorohydrin and bisphenol A. This epoxy polymer has an epoxide equivalent of 180–195, a viscosity of 100–160 poises and an average molecular weight of approximately 380. Epotuf 37–140 is another epoxy polymer of similar type. Another class of epoxy resin that may be indicated are the diglycidyl ethers of bisphenol A. Materials useful in curing these resins include amine curing agents. Primary aliphatic amines such as diethylene triamine, triethylene tetramine and diethylamino propylamine, and the like, have been employed. Polyamides having reactive amine groups such as the Versamid resins manufactured by General Mills, Inc. are effective amine hardeners or curing agents. The amine curing agents may be used alone or in combination. The novel compositions may also contain other constituents such as fillers, diluents, pigments, reactive or unreactive solvents, etc. It should be noted that additional curing catalysts such as tertiary amines may be added to the epoxy-amine hardener formulation before or after the addition of magnesium oxide or magnesium hydroxide. The addition of magnesium oxide or magnesium hydroxide to such compositions provides a method for readily and economically accelerating the curing of the resin without jeopardizing the physical properties of the cured resin.

As a result of this invention, it is possible to accelerate the cure of the epoxy and amine hardener formulation when these materials are employed in ratio approximating the stoichiometric ratio (1:1). This is particularly advantageous in the curing of small amounts of epoxy resin. The acceleration of the cure is also highly desirable when thin films as in adhesives and coatings and epoxy foams are involved. It is also possible as a result of this invention to reduce the level of amine considerably below the stoichiometric amount while maintaining the desirable chemical and physical properties of the polymer. Ratios of epoxy to amine curing agent as low as 1:0.3 may be employed when MgO or Mg(OH)$_2$ is a component of the formulation. The reduction in the amount of amine hardener to well below what is stoichiometrically required results in an increase in pot life and reduction in exotherm, properties that are of great significance depending upon the particular area of application intended for the plastic material. Although amines are used extensively to cure epoxy resins and catalysts are known which will accelerate the epoxy resin-amine curing agent reaction, magnesium oxide and magnesium hydroxide possess a distinct advantage over prior art accelerators, such as tertiary amines, in that they are far less toxic.

The amount of magnesium oxide which may be incorporated in the rapid curing system described above is about 0.1–15.0 per hundred parts of resin (phr.), about 2–4 phr. of magnesium oxide being preferred. When Mg(OH)$_2$ is used, 0.1–20.0 phr. performs effectively. Where the mixture of MgO and Mg(OH)$_2$ is employed, about 0.1–20.0 phr. may be used, the preferred range being 3–6 phr. The ratio of MgO to Mg(OH)$_2$ would depend on the properties desired, such as gel time and maximum exotherm. The amount of magnesium oxide or magnesium hydroxide is not critical, however, and other values may be used if desired. Although we do not wish to be bound by the theory involved, it is believed that the magnesium oxide and hydroxide act as catalysts in accelerating the cure of the epoxy resin by acting as electron donors and, accordingly, aiding in opening the oxirane ring, thus making the epoxy more reactive with amines. As demonstrated by the following examples, the particular form of the Mg(OH)$_2$ or MgO employed in the present invention is not critical and any commercially available product can be effectively utilized.

The novel compositions of matter according to the present invention may be prepared by dispersing the magnesium oxide or hydroxide into the epoxy resin and adding the curing agent by means of conventional mixing techniques such as a propeller-type stirrer. The method of incorporating and order of addition of the components can be varied without significantly affecting the reaction. In addition to the amine hardener, various ingredients such as hardeners, flexibilizers, reactive diluents, fillers and reinforcements and pigments may be employed in compounding the epoxy resin formulation. Curing catalysts such as tertiary amines may also be added to the system, before or after the addition of the magnesium oxide or hydroxide.

The effect of the presence of magnesium oxide and magnesium hydroxide and varying amounts thereof on the rate of cure is determined by noting the time the resin system gels. A sharp transition is readily detected by merely probing the cured resin with a spatula. Other standard tests such as the measurement of Barcol hardness and maximum exotherm are performed using standard, commonly used test methods.

In order to ascertain the ease with which the particular novel compositions of this invention may be utilized, several experiments were performed. It has been found that these compositions would impose no particular process difficulties due either to reactivity, viscosity, stickiness, or the like. The samples were cured at room temperature.

The following examples are given for the purpose of illustration and not by way of limitation.

EXAMPLE 1

To an epoxy resin (Epon 828) prepared from epichlorohydrin and bisphenol A is added the selected amount of magnesium oxide and the mixture is blended using a propeller-type mixer. Except in the case of a single sample which was aged, the amine hardener, triethylene tetramine was added to the mixture immediately after the addition of the magnesium oxide. The amount of epoxy resin and amine hardener was 60 grams and the samples were cured at room temperature. The magnesium oxide employed in this sample is Maglite–3333.

Three properties were measured:

(a) Maximum exotherm was indicated by recording the temperature in the center of the resin formulation by means of a thermocouple and a recorder. The higher the exotherm, the more efficient and convenient it is to cure thin samples of resin.

(b) Gel time was tested by probing with a spatula. Gel time is an indication of pot life. The increase in pot life is advantageous in the processing of epoxy resins since employing amines as epoxy curing agents normally results in a gel time that is shorter than would be desirable.

(c) Barcol hardness was tested with a Barcol Impressor. The longer the time to reach final hardness is an indication of how slowly the epoxy reaches its final cure state. Generally high Barcol readings are desirable since they are an indication that the cured epoxy is effectively crosslinked and would possess the preferred physical and chemical properties.

A 1:1 equivalents ratio indicates that the amount of amine was used in an equal stoichiometric ratio relative to the epoxy. The 1:1 formulation is the one conventionally utilized by the industry since it results in epoxy resins with highly satisfactory chemical and physical properties. As indicated in Example I, when MgO is added to the 1:1 stoichiometric ratio, there results a significant increase in maximum exotherm which is advantageous in the curing of thin layers such as adhesives, coatings and in epoxy foams.

When the amount of amine is reduced to 67% and 50% of what is stoichiometrically required and MgO is not present, an epoxy resin results which possesses unsatisfactory properties as indicated by its Barcol hardness value. A hardness reading of about 40 indicates a satisfactory epoxy resin product. The time necessary to reach its ultimate hardness indicates the time required until the compound is completely cured.

A reduction of the amount of toxic amine hardener normally employed is desirable as it will result in a lowering of the toxicity of the system. The table clearly shows that with low amine ratios, satisfactory hardness is obtained only when MgO is used. Besides the large improvement in hardness compared to the control, the maximum exotherm is maintained relatively low which is of interest when the epoxy material is used to fabricate large objects or thick sections. A further desirable effect concerning the gel-time or pot life is achieved upon the addition of MgO. The longer the pot life, the longer the resin may be worked. A longer pot life or gel time than that which results from a 1:1 ratio is generally desirable. The table clearly demonstrates that employing amounts of amine less than the stoichiometric ratio in combination with MgO results in a longer gel time or pot life than that which is obtained employing an equal stoichiometric ratio. The table further indicates that aging the MgO in the epoxy for seven days results in a relatively large increase in gel time compared with the corresponding nonaged sample. Thus, the desirable increase in gel time obtained by the use of magnesium oxide is further extended by aging the formulation prior to the addition of amine hardener. In addition to room temperature aging, heating the blend at temperatures up to 400° F. will produce a corresponding increase in gel time.

Similar results would be obtained when other epoxy resins and amine hardeners are used in place of Epon 828 and triethylene tetramine.

EXAMPLE 2

The same procedure as in Example 1 is carried out. The MgO used is Maglite K 3233, a grade of magnesium oxide. The $Mg(OH)_2$ is Marinco H 1211. The epoxy to amine ratio is 1:0.67 and 4 parts of accelerator is employed per hundred parts of resin.

TABLE II

| Accelerator | Max. exotherm, °F. | Gel time min. | Barcol hardness, after | | |
|---|---|---|---|---|---|
| | | | 1 day | 2 days | 7 days |
| None | 205 | 29 | 32 | 35 | 34 |
| MgO, 4 phr | 227 | 21 | 35 | 36 | 39 |
| $Mg(OH)_2$, 4 phr | 210 | 23 | 35 | 35 | 40 |

Example 2 demonstrates that $Mg(OH)_2$ behaves similarly to MgO. In addition to demonstrating an improvement in hardness while maintaining a relatively low maximum exotherm, the formulation containing $$Mg(OH)_2$$

results in a comparatively transparent cured epoxy which is of significance depending upon the particular application intended for the resin.

TABLE I

| Equivalents Ratio Epoxy:Amine | MgO (phr.) | Mag. exotherm, °F. | Gel time, min. | Barcol hardness, after— | | |
|---|---|---|---|---|---|---|
| | | | | 1 day | 2 days | 7 days | 65 days |
| 1:1 | 0 | 312 | 21 | 40 | | | 40 |
| 1:1 | 2 | 326 | 17 | 40 | | | 40 |
| 1:0.67 | 0 | 205 | 29 | 32 | 35 | 34 | 31 |
| 1:0.67 | 2 | 228 | 22 | 39 | 38 | 38 | 40 |
| 1:0.67 | 4 | 225 | 23 | 40 | 41 | 38 | 41 |
| 1:0.67 | ¹4 | 225 | 28 | 36 | 39 | 38 | 40 |
| 1:0.5 | 0 | 150 | 60 | 0 | 0 | 15 | 32 |
| 1:0.5 | 2 | 187 | 29 | 21 | 23 | 30 | 38 |

¹ 4 phr. MgO aged in epoxy resin during 7 days at room temperature, prior to the addition of the amine hardener.

Example 3

The procedure of Example 2 is repeated employing a mixture of 2 phr. MgO and 2 phr. $Mg(OH)_2$. As indicated in Table III, below, the results obtained are similar to that obtained with $Mg(OH)_2$, 4 phr., except for the extended gel time which may be a distinct advantage when a longer pot life is required.

TABLE III

Accelerator—MgO, 2 phr.+$Mg(OH)_2$, 2 phr.

| | |
|---|---|
| Max. exotherm, °F. | 210 |
| Gel time, min. | 35 |
| Barcol hardness: | |
| After 1 day | 34 |
| After 2 days | 36 |
| After 7 days | 40 |

It should be understood that, although this invention has been described with reference to particular embodiments thereof, the invention is susceptible to other modifications which appear within the spirit of the invention and the scope of the appended claims.

What is claimed is:

1. A process for preparing an epoxy resin containing a curing agent and having improved properties which comprises intimately admixing a polyepoxide containing a plurality of 1,2-epoxide groups, an amine curing agent selected from the group consisting of primary aliphatic amines and polyamides and an accelerator consisting essentially of magnesium hydroxide.

2. A process according to claim 1 wherein the equivalent ratio of epoxy to amine is from about 1:0.3 to 1:1 and there is employed 0.1–20.0 parts by weight of $Mg(OH)_2$.

3. A process according to claim 2 wherein 3–6 parts by weight of $Mg(OH)_2$ is used.

References Cited

UNITED STATES PATENTS

| | | |
|---|---|---|
| 2,900,364 | 8/1959 | Wasserman. |
| 3,268,477 | 8/1966 | Mueller. |

WILLIAM H. SHORT, Primary Examiner

T. PERTILLA, Assistant Examiner

U.S. Cl. X.R.

260—2, 18, 59, 830